(12) United States Patent
Wright et al.

(10) Patent No.: US 8,804,292 B2
(45) Date of Patent: Aug. 12, 2014

(54) PROTECTIVE CIRCUITRY CONTROLS POWER SUPPLY ENABLEMENT

(75) Inventors: Robert S Wright, Spring, TX (US); Nam Nguyen, Houston, TX (US); Richard W Clutter, Highlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 13/550,142

(22) Filed: Jul. 16, 2012

(65) Prior Publication Data

US 2014/0016237 A1    Jan. 16, 2014

(51) Int. Cl.
  *H02H 3/22*    (2006.01)
(52) U.S. Cl.
  USPC ........................................ 361/91.1; 361/111
(58) Field of Classification Search
  USPC ......................................... 361/18, 91.1, 111
  See application file for complete search history.

(56) References Cited

U.S. PATENT DOCUMENTS

| | | | |
|---|---|---|---|
| 6,418,002 B1 | 7/2002 | Yang et al. | |
| 6,731,486 B2 | 5/2004 | Holt et al. | |
| 6,901,520 B2 * | 5/2005 | Odaohhara et al. | 713/300 |
| 7,132,880 B2 | 11/2006 | Ingino | |
| 7,639,466 B2 | 12/2009 | Wang | |
| 7,826,190 B2 * | 11/2010 | Wu et al. | 361/91.1 |
| 2004/0108842 A1 * | 6/2004 | Oyama et al. | 323/267 |

OTHER PUBLICATIONS

ON Semiconductor, www.onsemi.com. Dual Synchronous Buck Controller. Publication Order No. NCP5425/D. Jul. 2006 Rev. 9. Semiconductor Components Industries, LLC.

* cited by examiner

*Primary Examiner* — Danny Nguyen

(57) ABSTRACT

A protective circuit compares at least two different signals and asserts a control node toward respective logic states accordingly. At least one of the signals is derived from a voltage on a power rail within a computer or other device. A switching element passes or isolates an enable signal based on the logic state of the control node, enabling or preventing operation of a power supply, accordingly. Central processing units (CPUs) or other elements are protected against electrically caused damage in the event that a fault is detected by the protective circuit.

12 Claims, 5 Drawing Sheets

| SIGNAL | DESCRIPTION |
|---|---|
| +12V_DUAL | 12 VOLTS; NORMALLY ALWAYS ON |
| PSON# | POWER SUPPLY ENABLE SIGNAL; FROM SOURCE |
| PSON# TO PS | POWER SUPPLY ENABLE SIGNAL; SWITCHED |
| +12V_CORE_IN | 12 VOLT RAIL TO CPU VOLTAGE REGULATOR(S) |
| +3P3V_AUX | 3.3 VOLTS; PULL UP FOR SUPERVISORY CHIP |
| VCORE | EQUAL TO: (0.12 VOLTS) + (CPU CORE VOLTAGE) |
| VCORE_VDDNB | ANALOGOUS TO +VCORE; FROM OTHER OUTPUT |
| VCHECK | EQUAL TO: (0.5)(+12V_CORE_IN) |

FIG. 4

| SCENARIO | EXAMPLE | RESULT |
|---|---|---|
| NO FAULT CONDITIONS | ALL MONITORED VOLTAGES NORMAL AND IN SEQUENCE | PSON# SIGNAL PASSES; NORMAL STARTUP |
| 12-VOLT RAIL LOW VOLTAGE | LOW IMPEDANCE FAULT BETWEEN 12-VOLT RAIL AND A LOW VOLTAGE NODE | PSON# SIGNAL BLOCKED; NO POWER SUPPLY STARTUP |
| 12-VOLT RAIL ZERO VOLTAGE | 12-VOLT RAIL FAULTED DIRECTLY TO GROUND NODE | PSON# SIGNAL BLOCKED; NO POWER SUPPLY STARTUP |

FIG. 5

PROTECTIVE CIRCUITRY CONTROLS POWER SUPPLY ENABLEMENT

BACKGROUND

Computers and other electronic entities consume electrical power provided at one or more regulated voltages. Certain electronic components are designed to modulate substantial electrical currents during the provision of regulated power to central processing units (CPUs) and other entities. Switching type power supplies are just one class that use power transistors during the controlled switching of such electrical currents during normal operation.

However, various failures can occur within such a power supply that result in the destruction of components that receive operating power there from. In just one example, the source-to-drain shorting of an "upper" field-effect transistor (FET) within a buck-type switching supply can result in the uncontrolled passing of destructively high voltages. Faults of this nature usually result in catastrophic damage to CPUs or other devices. The present teachings address the foregoing and related concerns.

BRIEF DESCRIPTION OF THE DRAWINGS

The present embodiments will now be described, by way of example, with reference to the accompanying drawings, in which:

FIG. 4 depicts a table of illustrative electrical signals and their designations according to one example;

FIG. 5 depicts a table of illustrative operating scenarios according to another example of the present teachings.

DETAILED DESCRIPTION

Introduction

A protective circuit is configured to compare at least two different signals, and to assert a control node toward respective logic states in accordance with the comparison. At least one of the signals is derived from a voltage on a power rail within a computer or other device. A switching element either passes or isolates an enable signal based on the logic state of the control node, thus either enabling or preventing operation of a power supply, accordingly. Central processing units (CPUs), electronic components or other entities are protected against electrically caused damage in the event that a fault is detected by the protective circuit.

In one example, an electronic circuit includes voltage divider circuitry that is configured to derive a check signal from a voltage present at a power rail. The electronic circuit also includes pass circuitry configured to couple a source voltage to a power node. The pass circuitry is configured to bias a control node toward a first state in accordance with a voltage present at the power node. The electronic circuit also includes a comparator configured to drive the control node to a second state in accordance with a comparison of the check signal with a core signal. The electronic circuit further includes a switch that is configured to selectively couple an enable signal to an output node in accordance with a present state of the control node.

In another example, a computer includes a main board configured to assert an enable signal. The computer also includes a power supply that is configured to provide at least one regulated voltage to the main board in response to the enable signal. The computer further includes a protective circuit configured to selectively couple the enable signal from the main board to the power supply in accordance with a comparison of a check signal with a core signal. The check signal is about half of a voltage provided on a power rail by the power supply. Additionally, the core signal is slightly greater than an operating voltage provided to a central processing unit of the main board.

In still another example, a method is performed using an electronic circuit, the method including passing a source voltage to a power node in response to an assertion of an enable signal. The method also includes biasing a control node toward a first state by way of a voltage at the power node. The method further includes comparing a check voltage with a core voltage and driving the control node to a second state if the core voltage is greater than the check voltage. The method also includes isolating the enable signal from an output node in response to a second state condition of the control node.

Illustrative Computer

Figure 1:
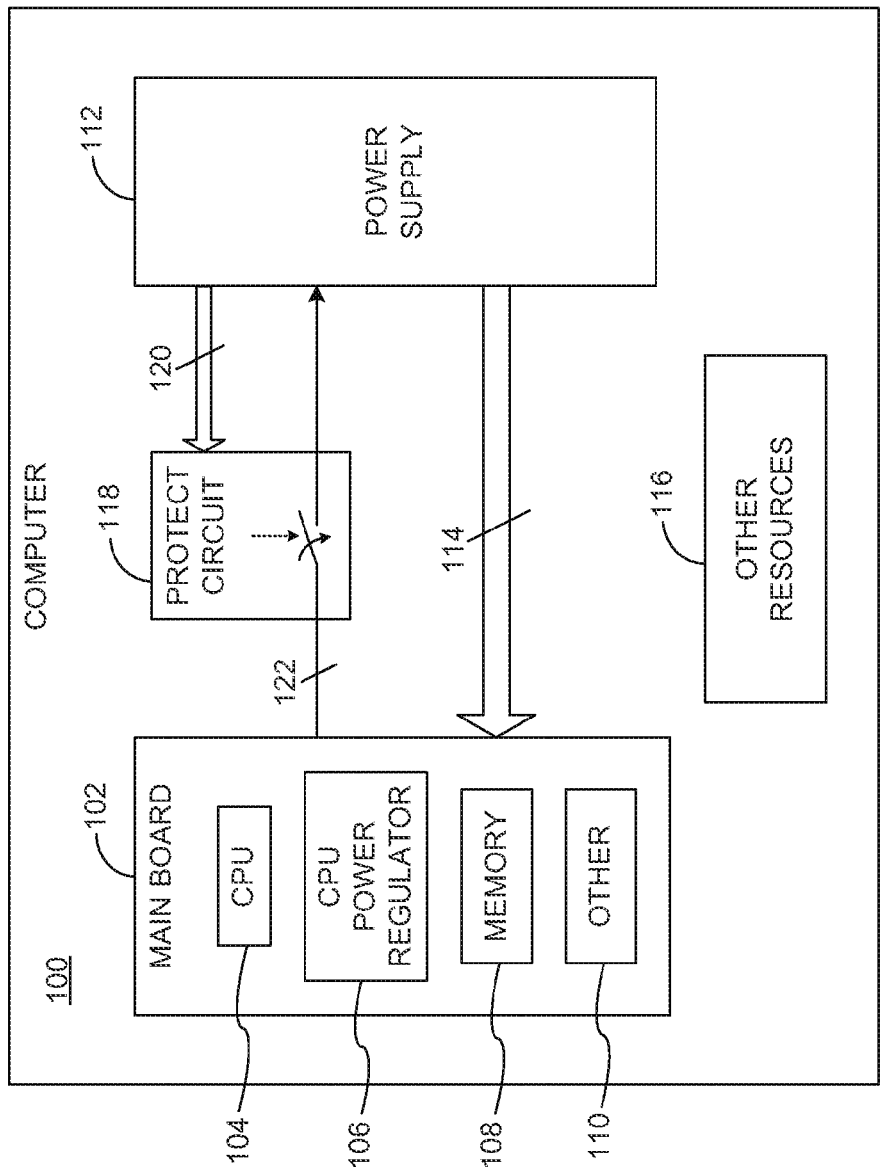
FIG. 1 depicts a block diagram of a computer according to one example of the present teachings.

Attention is now turned to FIG. 1, which depicts a computer 100 according to the present teachings. The computer 100 is illustrative and non-limiting with respect to the present teachings. Other computers, servers, electronic devices or entities can also be defined and used.

The computer 100 includes a main board 102. The main board 102 includes and supports various components, circuitry and input/output connections configured to perform respective normal operations. The main board 102 includes a central processing unit (CPU) 104. The CPU 104 can be defined by any suitable such entity configured to perform various functions in accordance with a machine-readable program code.

The main board 102 also includes a CPU power regulator (regulator) 106 configured to receive a regulated voltage from a power supply and to provide at least one voltage of lesser value to the CPU 104. The main board 102 also includes memory 108. The memory 108 is configured to store digitally encoded data that is accessible by the CPU 104.

The main board 102 further includes other resources 110. The other resources 110 can include, without limitation, input/output circuitry, wireless signaling resources, indicating lights, electrical connectors, watchdog circuitry, and so on. Other entities or circuits can also be included in the other resources 110. Further elaboration regarding the other resources 110 is not necessary for an understanding of the present teachings.

The computer 100 also includes a power supply 112. The power supply 112 is configured to receive line-level electrical energy from an external source, such as a utility supplier, and to provide one or more regulated voltages. In one example, the power supply 112 is defined by or includes a buck-type switching power circuit. Other embodiments can also be used. In particular, the power supply 112 is configured to provide one or more respective operating voltages 114 to the main board 102. The power supply 112 can provide operating power to other entities within the computer 100, as well.

The computer 100 also includes other resources 116. The other resources 116 can include any suitable device, entity, sub-system, peripheral, and so on, in accordance with normal operations of the computer 100. Non-limiting examples of such other resources 116 include magnetic storage media, removable storage media, optical storage media, user interface devices, an electronic display, and so on. One having ordinary skill in the computer or related arts is aware of various other resources 116 as used in accordance with normal computer operations, and further elaboration is not germane to an appreciation of the present teachings.

The computer 100 further includes a protective circuit (circuit) 118. The circuit 118 is defined and configured in accordance with the present teachings. The circuit 118 receives various voltages or signals 120 from the power supply 112. The circuit 118 is also configured to selectively couple an enable signal 122 from the main board 102 to the power supply 112. Such an enable signal 122 is formatted to cause the power supply 112 to startup and maintain normal operations.

In particular, the circuit 118 is configured, among other things, to compare at least two distinct signals and to pass the enable signal 122 to, or block the enable signal 122 from, the power supply 112 in accordance with the comparison or comparisons. Specific description of at least one example of the circuit 118 is provided hereinafter.

Illustrative Protective Circuit

Figure 2:
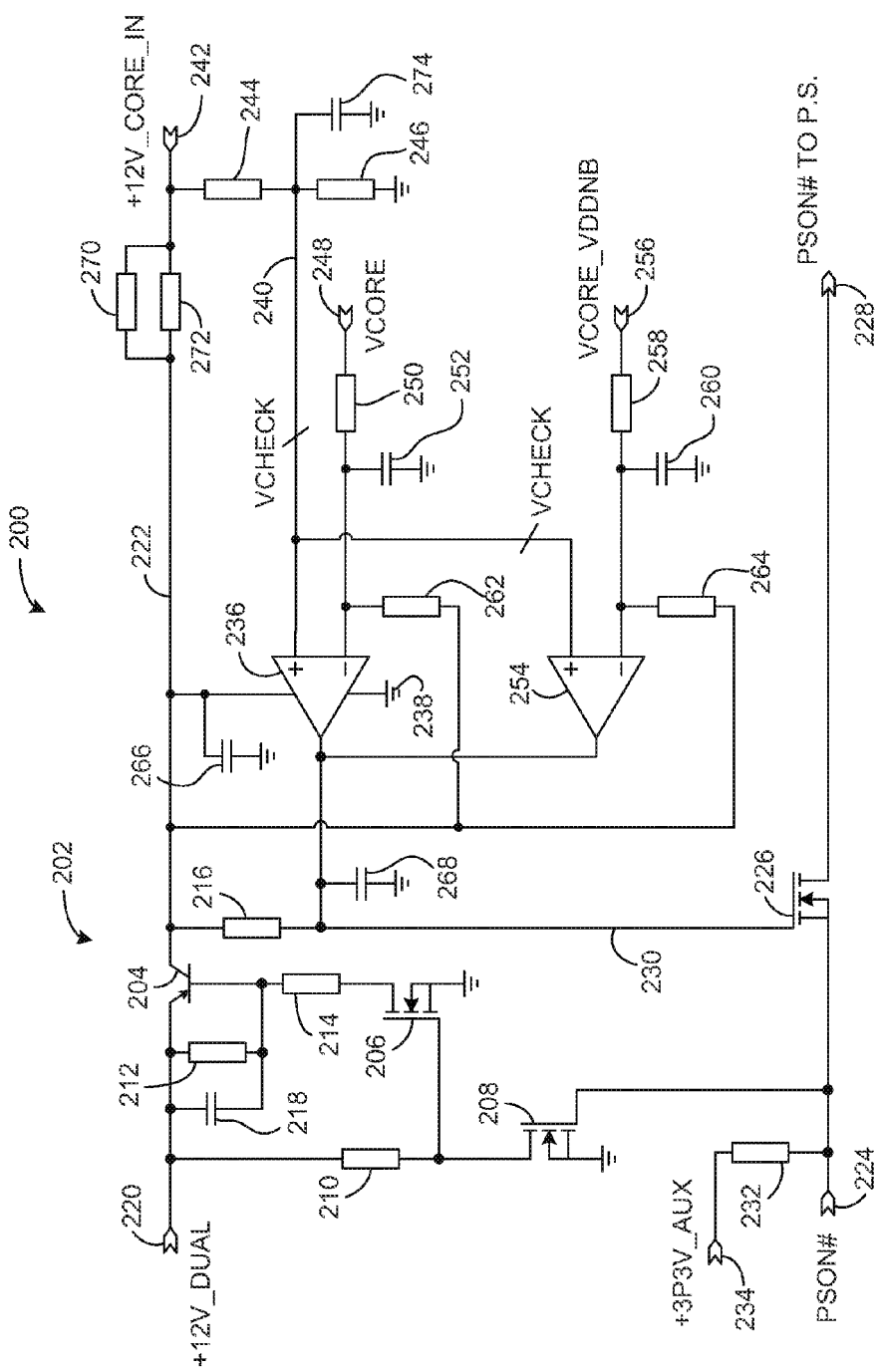
FIG. 2 depicts a schematic of a protective circuit in accordance with another example.

Reference is now made to FIG. 2, which depicts a schematic view of a protective circuit (circuit) 200. The circuit 200 is illustrative and non-limiting with respect to the present teachings. Other circuits having respectively varying components and configurations can also be used. In one alternative, the circuit 200 is at least partially defined by an application-specific integrated circuit (ASIC). Other embodiments can also be used. In one example, the circuit 118 is equivalent or analogous to the circuit 200.

The circuit 200 includes pass circuitry 202. The pass circuitry 202 includes (or is defined by) respective transistors 204, 206 and 208, respective resistors 210, 212, 214 and 216, and a capacitor 218. The pass circuitry 202 is configured to receive an electrical source voltage "+12V_DUAL" at a node 220 and to couple or pass that voltage on to a power node 222 in accordance with a present state of an enable signal "PSON#" at a node 224. Specifically, electrical potential at the node 220 is coupled to the power node 222 when the PSON# signal is asserted to a logic "low" or about zero-volts condition.

The circuit 200 also includes a transistor 226. The transistor 226 is configured to function as a switching element that couples the enable signal PSON# to an output node 228 in accordance with the present state of a control node 230. In particular, the transistor 226 assumes an electrically conductive mode ("on") when the node 230 is biased to a logic "high" condition, and assumes a non-conductive mode ("off") when the control node 230 is biased to a logic "low" condition.

The resistor 216 is configured to bias the control node 230 toward a logic "high" condition when positive non-zero voltage is present at the power node 222. Other suitable switching elements or operative schema can also be used. The circuit also includes a resistor 232 configured to bias the node 224 toward a logic "high" condition by way of a voltage "+3P3V_AUX" present at a node 234. The voltage at the node 234 is normally provided by a power supply (e.g., 112).

The circuit 200 also includes a comparator 236. The comparator 236 is coupled to receive operating power from the power node 222 and a ground node 238. The comparator 236 is also coupled to receive a check signal "VCHECK" at a node 240, which is derived from a voltage "+12V_CORE_IN" at a power rail 242 by way of a voltage divider. The voltage divider is defined by respective resistors 244 and 246. In one example, the VCHECK signal is about equal to one-half of the voltage at the power rail 242. Other suitable voltages or fractions can also be used.

The comparator 236 is also coupled to receive a core signal "VCORE" at a node 248 by way of a resistor 250 and capacitor 252. The VCORE signal at the node 248 is provided by a power supply (e.g., 112) and is about equal to a normal operating core voltage for a CPU plus 0.12 volts. Other suitable voltages can also be used.

The comparator 236 is configured to compare the VCHECK and VCORE signals and to drive the control node 230 to a logic "low" condition if the VCORE signal (node 248) is of greater voltage than the VCHECK signal (node 240). Otherwise, the comparator 236 is configured to provide a floating or "high-Z" output signal, and the control node 230 remains biased to a logic "high" condition. Thus, the transistor 226 is biased "on" during normal operating conditions, and is biased "off" when the VCORE signal is greater than the VCHECK signal.

The circuit 200 also includes another comparator 254. The comparator 254 is coupled to receive the check signal VCHECK at the node 240. The comparator 254 is also coupled to receive another, distinct core signal "VCORE_VDDNB" at a node 256 by way of a resistor 258 and capacitor 260. The VCORE_VDDNB signal is provided by a power supply (e.g., 112) and is about equal to (another) normal operating core voltage for a CPU plus 0.12 volts. Other suitable voltages can also be used.

The comparator 254 is configured to compare the VCHECK and VCORE_VDDNB signals and to drive the control node 230 to a logic "low" condition if the VCORE_VDDNB signal (node 256) is of greater voltage than the VCHECK signal (node 240). Otherwise, the comparator 254 is configured to provide a floating or "high-Z" output signal, and the control node 230 remains biased to a logic "high" condition.

The circuit 200 also includes a resistor 262 configured to bias the inverting input of the comparator 236 toward the voltage at the node 222. The circuit 200 includes another resistor 264 configured to bias the inverting input of the comparator 254 toward the voltage at the node 222. The circuit 200 further includes respective filtering or "time constant" capacitors 266, 268 and 274. The circuit 200 additionally includes respective resistors 270 and 272 configured to bias the node 222 toward the voltage "+12V_CORE_IN" present at the power rail 242.

Normal, general operation of the protective circuit 200 is as follows: The circuit 200 receives respective voltages at the nodes 220, 234 and 242 as described above. The VCHECK signal is derived from the voltage present at the power rail 242. Respective core signals are also received at the nodes 248 and 256. The comparators 236 and 254 compare the VCHECK signal against the respective core signals at the nodes 248 and 256, and drive the control node 230 to logic condition (i.e., essentially zero volts) if the VCHECK signal is not greater than both of the core signals. That is, if either the VCORE signal or the VCORE_VDDNB signal is greater than the VCHECK signal, the control node 230 is driven to logic "low" condition. Otherwise, the control node 230 is biased to a logic "high" condition by virtue of the resistor 216 and the voltage present at the node 222.

The transistor 226 exhibits a conductive state if the control node 230 is at logic "high" condition, and the PSON# signal is passed through to the output node 228. Conversely, the transistor 226 exhibits a non-conductive state if the control node 230 is at logic "low" condition and the PSON# signal is isolated from the output node 228.

A power supply (e.g., 112) coupled to the output node 228 is signaled to start up (or remain operating) if the asserted PSON# signal is sent through to node 228, and is prevented from starting up (or operating) if the PSON# signal is blocked. The circuit 200 therefore performs a protective function, preventing a power supply from providing excessive voltage to CPUs or other elements in the event that the respective signal comparison tests are not continuously satisfied.

Illustrative Table of Circuit Elements

Figure 3:
FIG. 3 depicts a table of illustrative components according to one example of the circuit of FIG. 2.

Attention is turned now to FIG. 3, which depicts a table 300 of elements in accordance with one example of the protective circuit 200. The table 300 is illustrative and non-limiting in nature, and other protective circuits having respectively varying elements or electrical characteristics are also contemplated, Illustrative Table of Electrical Signals Reference is made now to FIG. 4, which depicts a table 400 of electrical signals in accordance with the protective circuit 200. The table 400 is illustrative and non-limiting in nature, and other protective circuits having other respectively varying electrical signals, voltage values or ranges, or designations are also contemplated.

Illustrative Table of Operating Scenarios

Attention is directed to FIG. 5, which depicts a table 500 of respective operating scenarios in accordance with the protective circuit 200. The table 500 is illustrative and non-limiting in nature, and other operating scenarios corresponding to other circuits or circuit responses are also contemplated.

The table 500 includes a scenario 502, in which no fault conditions are detected. Thus, all input signals and voltages are within expected, normal operating parameters and neither comparator 236 nor 254 operates to isolate the PSON# signal. The PSON# signal at node 224 is therefore coupled to the output node 228 by way of the transistor 226, and full startup and maintained operation of a corresponding power supply (e.g. 112) is performed.

The table 500 also includes a scenario 504, in which the power rail 242 exhibits lesser than normal operating voltage. In particular, a low-impedance fault couples the power rail 242 to another node operating at a lesser voltage. As a result, the VCHECK signal at node 240 is lesser than the VCORE signal at node 248. The comparator 236 responds to this differential by driving the control node 230 to a logic "low" condition, shutting "off" the transistor 226 and isolating the PSON# signal from the output node 228.

The table 500 further includes a scenario 506, in which the power rail 242 exhibits a much lesser than normal operating voltage. In particular, a zero or near-zero impedance fault couples the power rail 242 to the ground node 238. As a result, the VCHECK signal at node 240 is appreciably lesser than the VCORE signal at node 248. The comparator 236 responds to this differential by driving the control node 230 to a logic "low" condition, shutting "off" the transistor 226 and isolating the PSON# signal from the output node 228.

The table 500 depicts a number of illustrative fault conditions that the circuit 200 can detect and respond to so as to prevent startup or halt the operation of a power supply. Such responses occur quickly and before damaging voltage levels can be provided to a CPU or CPUs, or other components of a computer (e.g., 100) or other device.

Illustrative Method

Figure 6:
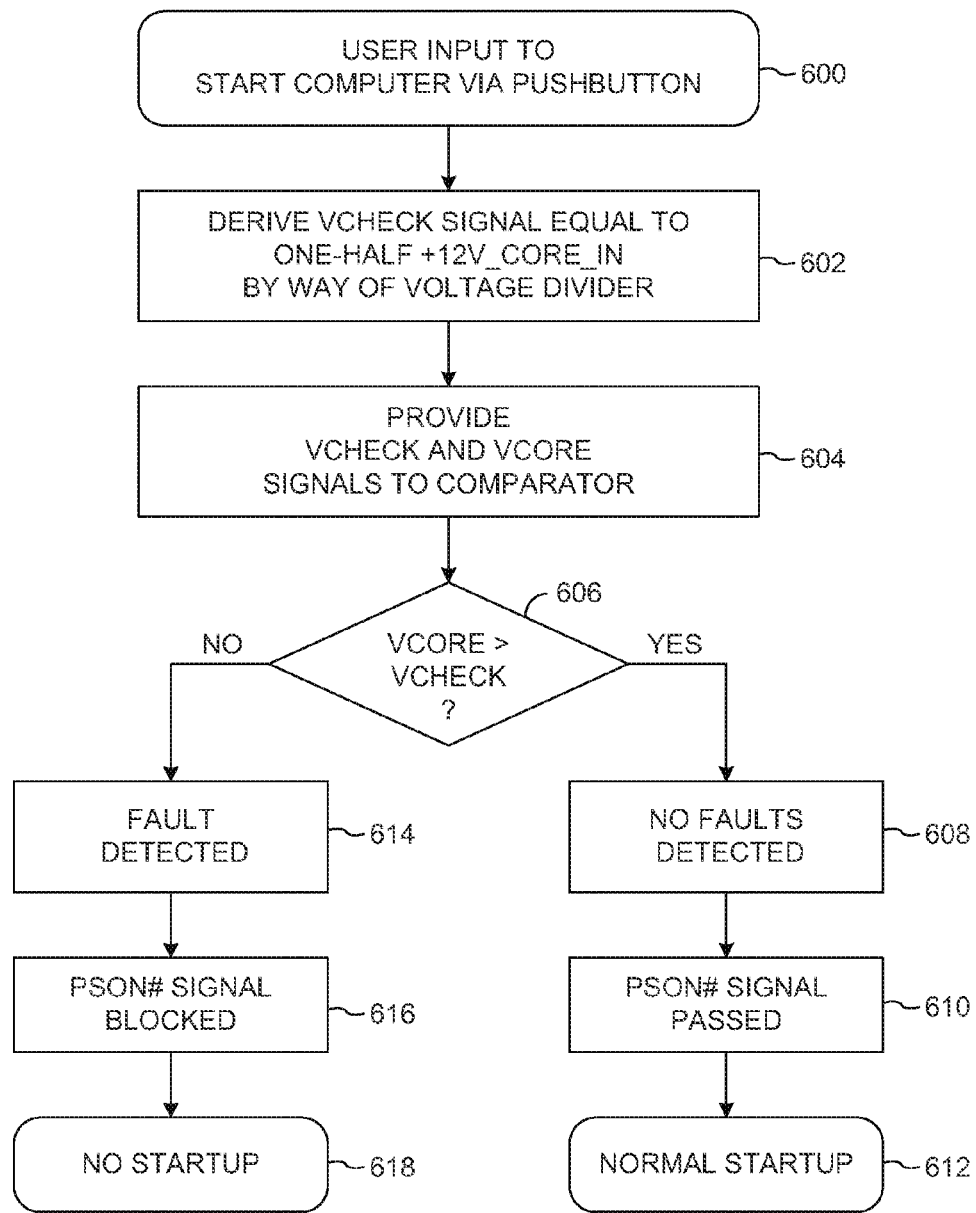
FIG. 6 depicts a flow diagram of a method in accordance with another example of the present teachings.

Reference is made now to FIG. 6, which depicts a flow diagram of a method in accordance with the present teachings. The method of FIG. 6 depicts particular steps and an order of execution. However, other methods including other steps, omitting one or more of the depicted steps, or proceeding in other orders of execution can also be defined and used. Thus, the present teachings contemplate other methods that can be respectively varied. Reference is also made to FIGS. 1 and 2 in the interest of understanding the method of FIG. 6.

At 600, a user input is received via pushbutton to start a computer. For purposes of a present example, a user input is received via a pushbutton of other resources 116 of a computer 100. The computer 100 now begins a normal startup procedure.

At 602, a VCHECK signal is derived from a power rail by way of voltage divider. In the present example, a normal twelve volts DC is present at power rail (node) 242. A voltage divider defined by resistors 244 and 246 provides a VCHECK signal, equal to about one-half of the voltage at the node 242 (i.e., about six volts under no-fault conditions), at a node 240.

At 604, respective VCHECK and VCORE signals are provided to a comparator. In the present example, the VCHECK signal at the node 240 is provided to the non-inverting input of a comparator 236. Also, a VCORE signal is provided to the inverting input of the comparator 236.

At 606, it is determined if the VCORE signal is greater than the VCHECK signal. In the present example, the comparator 236 drives an output signal at the control node 230 according to a comparison of the VCHECK and the VCORE signals. If the VCORE signal is greater than the VCHECK signal, then the method proceeds to step 608 below. If the VCORE signal is lesser than the VCHECK signal (or equal thereto), then the method proceeds to step 614 below.

At 608, no faults were detected in accordance with the comparison made at step 606 above.

At 610, the PSON# signal is passed to the power supply. In the present example, the transistor 226 is biased in a conductive state and the PSON# signal at node 224 is passed through to the output node 228.

At 612, normal startup of the computer continues. In the present example, the PSON# signal is provided to a power supply 112 by way of node 228 and the power supply 112 continues startup and assumes a normal operating mode. Various operating voltages 114 are provided to a main board 102 and the CPU(s) 104 is/are provided with the core voltages that they require for normal operations. This normal startup and run mode is maintained until a fault, if any, is detected.

At 614, a fault is detected with respect to the power rail in accordance with the comparison made at step 606 above.

At 616, the PSON# signal is blocked from reaching the power supply. In the present example, the transistor 226 is driven into a non-conductive state and the PSON# signal at node 224 is prevented from passing through to the output node 228.

At 618, startup of the computer is prevented. In the present example, the PSON# signal does not reach the power supply 112, which in turn does not continue its startup procedure. Operating voltages are therefore not provided to the main board 102 and the CPU(s) 104 or other components are protected against over-voltage or similar damage. This protective/intervention mode is maintained until the fault or faults are cleared, or other corrective steps are taken as needed.

In general, the present teachings contemplate various circuits and systems directed to protecting CPUs, electronic components and other entities against damage due to over-voltage exposure or similar events. An illustrative circuit includes one or more comparators that compare a core (or reference) voltage against a voltage derived from a power rail or node. A control node is driven to a pre-determined logic state if a fault is detected by way of one or more such comparisons. The control node is otherwise biased to a different pre-determined logic state if no fault is detected.

A switching element, such as a transistor or other suitable entity, is caused to operate in accordance with the present logic state of the control node. In a first, no-fault state, the switching element couples an enable signal to an output node causing a power supply to startup and maintain normal, full-scale operation. A computer or other device is thus provided with various voltages as required for normal operations.

In a second, fault-detected state, the switching element isolates the enable signal from the output node such that the power supply cannot startup or maintain normal operation. Consequently, CPUs or other components of a computer or other device are protected against over-voltage or similar damage.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An electronic circuit, comprising:
   voltage divider circuitry configured to derive a check signal from a voltage present at a power rail;
   pass circuitry configured to couple a source voltage to a power node, the pass circuitry configured to bias a control node toward a first state in accordance with a voltage present at the power node;
   a comparator configured to drive the control node to a second state in accordance with a comparison of the check signal with a core signal; and
   a switch configured to selectively couple an enable signal to an output node in accordance with a present state of the control node,
      wherein the comparator defines a first comparator and the core signal defines a first core signal, and
      wherein the electronic circuit further includes a second comparator configured to drive the control node to the second state in accordance with a comparison of the check signal with a second core signal.

2. The electronic circuit according to claim 1, the pass circuitry configured to couple the source voltage to the power node when the enable signal is asserted.

3. The electronic circuit according to claim 1 further comprising a resistor configured to bias the control node toward the first state by way of a signal present at the power node.

4. The electronic circuit according to claim 1, the voltage divider configured such that the check signal is about equal to one-half of the voltage present at the power rail.

5. The electronic circuit according to claim 1, the electronic circuit such that the core signal is about equal to 0.12 volts plus an operating core voltage of a central processing unit (CPU).

6. The electronic circuit according to claim 1, the electronic circuit such that the enable signal is formatted to cause a power supply to assume a normal startup or operating mode.

7. The electronic circuit according to claim 1, the electronic circuit configured to receive the enable signal from a main board of a computer, the main board including at least one central processing unit (CPU).

8. A computer, comprising:
   a main board configured to assert an enable signal;
   a power supply configured to provide at least one regulated voltage to the main board in response to the enable signal; and
   a protective circuit configured to selectively couple the enable signal from the main board to the power supply in accordance with a comparison of a check signal with a core signal, the check signal being about half of a voltage provided on a power rail by the power supply, the core signal being slightly greater than an operating voltage provided to a central processing unit of the main board,
      wherein the protective circuit is further configured to bias a control node toward a first state in accordance with a voltage present at a power node, the enable signal being coupled to the power supply when the control node is in the first state, the enable signal being isolated from the power supply when the control node is driven into a second state distinct from the first.

9. The computer according to claim 8, the protective circuit configured to derive the check signal by way of a voltage divider.

10. The computer according to claim 8, the protective circuit configured to receive the core signal from the power supply.

11. The computer according to claim 8, the protective circuit also configured to selectively couple the enable signal to the power supply in accordance with a comparison of the check signal with a secondary signal distinct from the core signal.

12. A computer, comprising:
   a main board configured to assert an enable signal;
   a power supply configured to provide at least one regulated voltage to the main board in response to the enable signal; and
   a protective circuit configured to selectively couple the enable signal from the main board to the power supply in accordance with a comparison of a check signal with a core signal, the check signal being about half of a voltage provided on a power rail by the power supply, the core signal being slightly greater than an operating voltage provided to a central processing unit of the main board,
      wherein the protective circuit is further configured to selectively couple the enable signal to the power supply in accordance with a comparison of the check signal with a secondary signal distinct from the core signal.

* * * * *